(12) United States Patent
Wright

(10) Patent No.: US 6,775,946 B2
(45) Date of Patent: Aug. 17, 2004

(54) REMOTE IDENTIFYING ANIMAL TRAP

(75) Inventor: Amy Christine Wright, Aurora, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 09/878,822

(22) Filed: Jun. 11, 2001

(65) Prior Publication Data

US 2002/0184811 A1 Dec. 12, 2002

(51) Int. Cl.⁷ ............................................. A01M 23/02
(52) U.S. Cl. ................................................ 43/61; 43/81
(58) Field of Search ............................ 43/58, 81, 121, 43/61; 340/573.3, 573.1

(56) References Cited

U.S. PATENT DOCUMENTS

| | | | |
|---|---|---|---|
| 4,275,523 A | * | 6/1981 | Baima et al. ................. 43/112 |
| 5,005,416 A | * | 4/1991 | Vick et al. ..................... 43/121 |
| 5,040,326 A | * | 8/1991 | Van Dijnsen et al. ......... 43/139 |
| 5,154,017 A | * | 10/1992 | Disalvo .......................... 43/81 |
| 5,477,635 A | * | 12/1995 | Orsano .......................... 43/81 |
| 5,794,625 A | * | 8/1998 | McCarley et al. .......... 600/549 |
| 6,067,018 A | * | 5/2000 | Skelton et al. ........... 340/573.3 |
| 6,202,340 B1 | * | 3/2001 | Nieves .......................... 43/61 |
| 6,275,159 B1 | * | 8/2001 | Pinnow et al. ........... 340/573.1 |
| 6,364,834 B1 | * | 4/2002 | Reuss et al. ................ 128/903 |

* cited by examiner

Primary Examiner—Charles T. Jordan
Assistant Examiner—T. Nguyen
(74) Attorney, Agent, or Firm—Fitch, Even, Tabin & Flannery

(57) ABSTRACT

An arrangement for displaying the state of a plurality of animal traps is disclosed. Each trap senses the position of a movable trapping portion such as a trap door or jaw and rf transmits the state of the movable portion. A display unit receives the rf transmissions from the traps and identifies and displays the then current state of each trap. The rf signals may be periodically sent from the traps and/or they may be sent in response to a change in state of the movable portion.

14 Claims, 3 Drawing Sheets

REMOTE IDENTIFYING ANIMAL TRAP

The present application relates to wireless reporting of events and more particularly to the wireless reporting of the state of animal traps.

The surveillance of multiple events at a common display is a routine event today. The surveyed events may be present states of doors and windows in a security system which are usually surveyed using hard wired sensors at fixed locations. The system components at the doors and windows are not moved from location to location so re-wiring is not a required event.

Certain items such as animal traps are frequently placed in many locations and then moved about as needs arise elsewhere. Ordinarily, an individual must remember where each trap has been placed and occasionally check the traps visually to see whether they have been sprung so that they can be reset and re-baited. The task of trap checking is made even more critical in certain commercial food establishments where prevailing laws invoke penalties if an animal has been trapped for too long a period of time. A need exists for a detection and display system which allows an operator to easily identify which of a plurality of animal traps needs to be tended to and further allowed the easy movement of traps without re-wiring sensors.

SUMMARY

This need is met and a technical advance is achieved in accordance with the present invention which includes wireless transmitters in association with each of a plurality of animal traps and a central display unit which receives signals from the traps and displays indicia of the state of the trap.

In accordance with an embodiment of the invention, each of a plurality of animal traps includes a radio frequency (rf) transmitter and a sensor to detect the position of a movable part of the trap. In the case of a normal rodent trap, the movable portion may be the metal jaw of the trap and in the case of a humane trap, the movable portion may be a closing door. The rf transmitter may periodically transmit a signal which uniquely identifies the transmitting trap and which includes an indication such as set or sprung to indicate the position of the movable portion. The control unit receives each transmission from the animal trap transmitters and decodes it to determine the identity of the trap and the present condition of its movable portion. The central unit may then display the results, for example by means of a pair of light emitting diodes, one for set and one for sprung, associated with each trap designation. In other embodiments the change of state of the movable portion of a trap may trigger the rf transmission of the trap identity and the then current state of the movable portion. As with periodic transmission the central unit responds to each received rf transmission by decoding the information to identify the trap in which a change has occurred and display the current state of that trap.

In still further embodiments the rf transmitters of one or more of the traps may transmit status signals both at a regular interval, e.g., 2 minutes, and whenever a state change occurs.

DESCRIPTION

Figure 1:
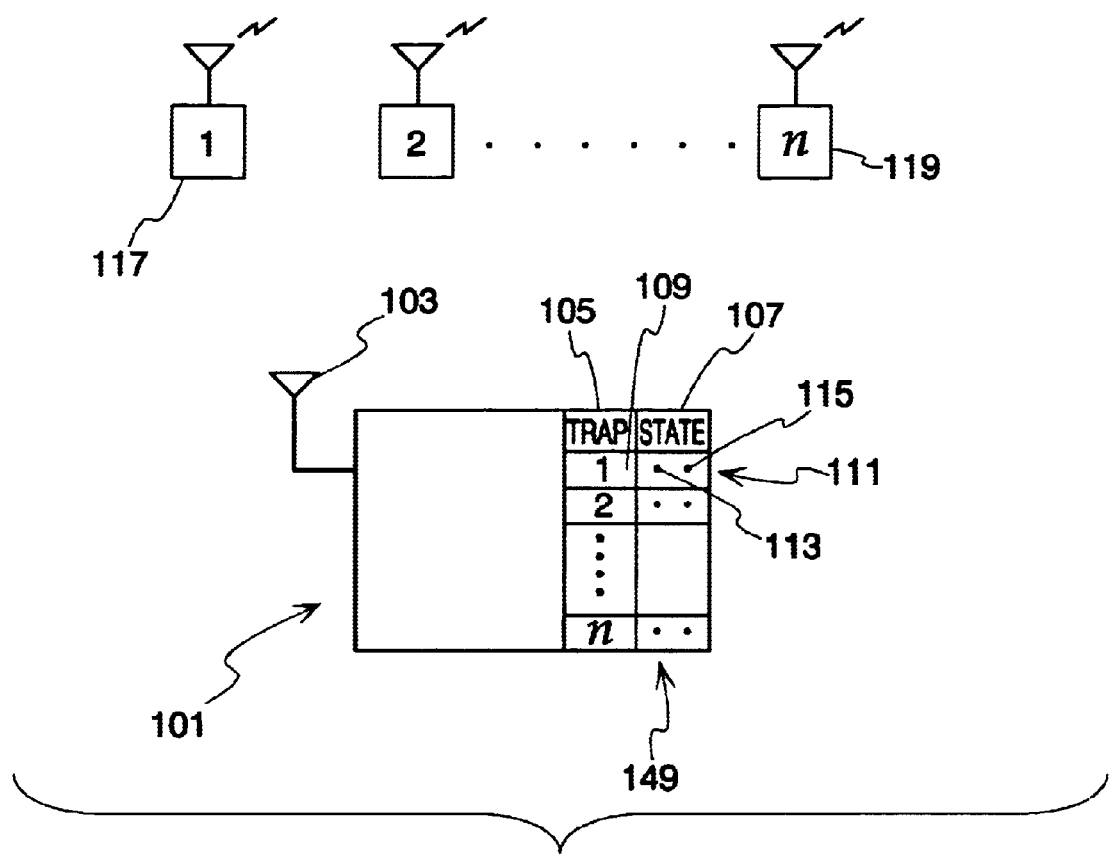
FIG. 1 is a representation of an animal trap alert arrangement including a plurality of animal traps and a display unit.

FIG. 1 is a representation of an animal trap display system including a central display unit 101 having a receiving antenna 103 and a display board 149 including a list of animal trap identities 105 in association with a list of trap states 107. As shown, each trap identity e.g. 109 is associated with a pair of light emitting diodes (LED) 111 of different colors. For example, one LED 113 on the left is green to indicate that the associated trap remains set and a second LED 115 is red to indicate that the associated trap needs attention.

Figure 2:
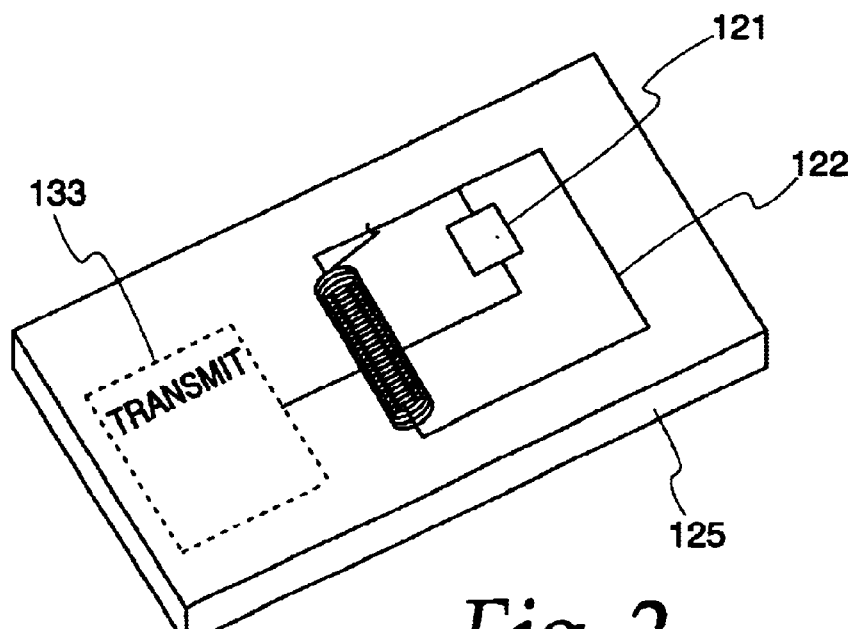
FIG. 2 is a perspective view of an animal trap.

Also included in the system of FIG. 1 is a plurality of animal traps 1 through n of which trap 1 is assigned reference numeral 117 and trap n is assigned reference numeral 119. Each trap 117 through 119 includes a trap sensor 121 (FIG. 2) and a wireless transmitter in addition to the normal trap mechanism 125 as shown in FIG. 2. The trap mechanism in FIG. 2 is a standard household rodent trap, however, other trap mechanisms might be employed. The trap may be a humane trap of the cage variety with a closing door or a more rugged outdoor variety of the clamp trap such as the type used to capture fur bearing animals such as bear and mink. The only requirement of the trap mechanism is that a detector should be able to sense that the trap has been sprung or that the trap contains one or more captured animals. In the following embodiment, the trap is shown and described as a household rodent trap commonly called a mouse trap. The trap includes a movable portion 122 which is used in the normal manner to trap animals.

Figure 3:
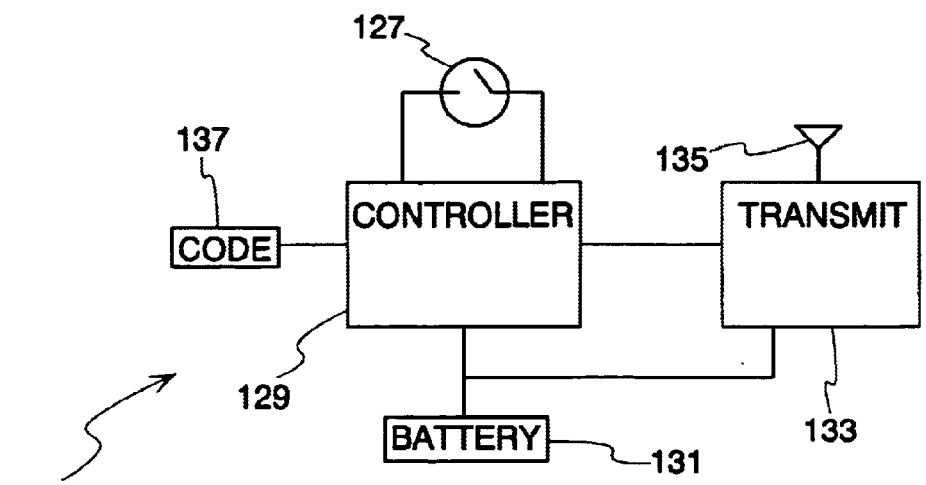
FIG. 3 is a block diagram of circuitry comprised by the animal traps.

FIG. 3 represents the electrical circuit associated with the traps 117–119. Such circuitry may be embedded within the trap body as shown in FIG. 2 or separate therefrom provided that the circuitry can sense the state of the trap. In FIG. 3 the sensor 121 is represented as a single pole single throw switch 127 which is connected to a controller 129. The sensor 121 may be mechanically, magnetically, electrically or optically coupled to the moving portion 122 of the trap. The exact nature of the sensor is not critical to applicant's invention. Also shown is a transmitter 133 with an associated antenna 135. The transmitter is of a type well known in the art which AM modulates a carrier frequency to transmit signals. It should be mentioned that the transmitters of all of the traps 117–119 transmit at the same carrier frequency in the present embodiment, however, such is not required. Also included in the transmitter system of FIG. 3 are an identity code storage 137 and a battery 131. The code stored by storage 137 is unique to a particular trap so that the code can be decoded at a receiver to identify which trap is transmitting. In the present embodiment, thirty two traps 117–119 are possible so the identity code should comprise at least 5 binary digits (bits). Other numbers of traps can be used in other embodiments and codes of different length are necessary.

The controller 129 periodically reads the state of sensor switch 127 and transmits a message including the code of the transmitting trap and the then present state of the trap. Additionally, the controller senses each change of state of the trap and transmits a signal within a few seconds of the change of state to contemporaneously signal the new state to a control unit.

Figure 4:
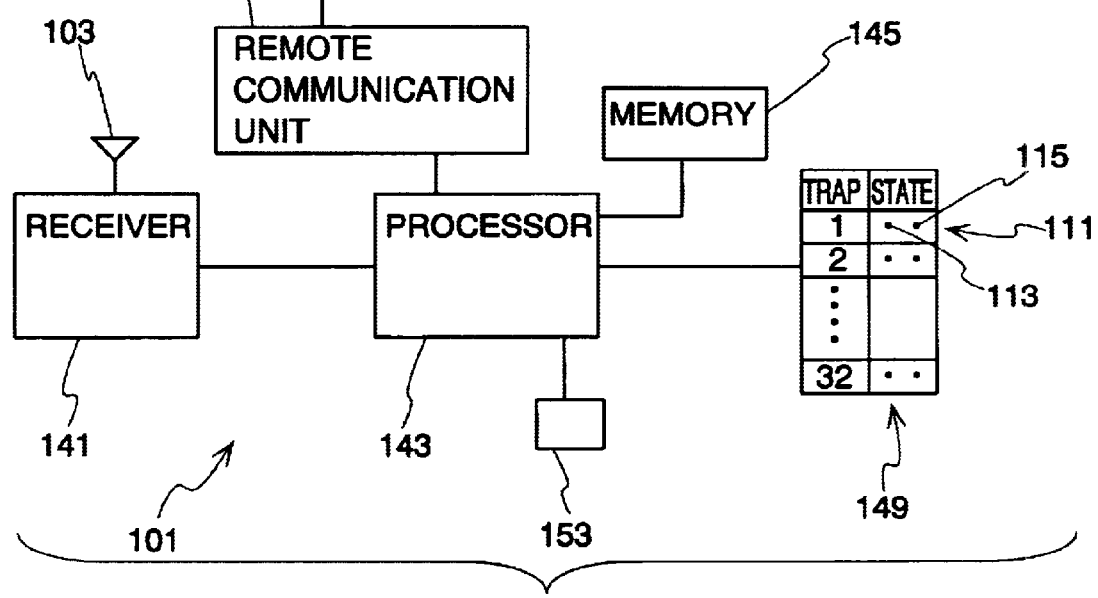
FIG. 4 is a block diagram of circuitry comprised by the display unit.
Figure 5:
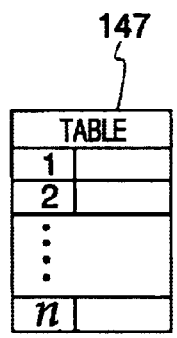
FIG. 5 shows a table stored by a processor of the display unit.

A block diagram of the central display unit 101 is shown in FIG. 4. A receiver 141 of the central display unit is tuned to receive the rf transmissions from the traps 117–119 and to connect the code and trap state received in those transmissions to a processor 143 which may be a programmed microprocessor having a memory 145. Memory 145 stores the program and data for controlling the processor and may consist of a plurality of memory circuits including ROM for the program and non-volatile RAM for storing certain trap related data. Also stored in memory 145 is a data table having an entry for each trap 117–119 which stores the last look state of the trap and the identification code representing the trap. The table of trap data is represented in FIG. 5 as 147. Display unit 101 also includes a display section 149 comprising the pair of LEDs for each trap and a printed designation for the associated trap. As shown in FIG. 4, thirty two trap designations are arranged in a column and the associated pair of LEDs e.g. 113 and 115 are arranged in a row with the trap designations. In addition, the central unit 101 may be equipped to provide trap state data to remote locations when the animal trap identifying system is not readily available. When so equipped, the system includes remote communication unit 146 which is advised of each trap state change detected by processor 143. Upon being advised, the remote communication 146 dials a preset telephone number to alert a human operator or initiates an automatic e mail message to the operator.

Each trap includes a code storage device 137 to store the unique code of the trap. This storage device 137 may be a permanently written code in the ROM of controller 129 or in the present embodiment in a multi position DIP switch. The user sets the positions of the dip switches of each trap to a different combination of positions. The display unit 101 includes a learn mode switch 153 connected to the processor 143 which, when depressed by the user, causes processor 143 to enter the learn mode. In the learn mode, which may last for 10–20 seconds, the processor receives a code and state transmitted from a trap and checks each trap entry of table 147 to see if the received code is being used by another trap. When the code is not already in use and thus is not stored in table 147 the new code is so stored in the next available position of trap table and both LEDs associated with that first available entry are flashed to alert the user of a successful learning operation. When an already in use code is received during a learn operation, such is identified by the check of codes and no LEDs are flashed. Learning mode operation is described in detail in U.S. Pat. No. 4,750,118 which is hereby incorporated by reference, and is generally well known in the art.

The present embodiment includes DIP switches in the traps and learning of identity codes by the display unit, however, other methods for trap identification could be used. For example, the traps and display could be sold as a set and each trap identity fixed in the trap and permanently memorized by the display unit.

Figure 6:
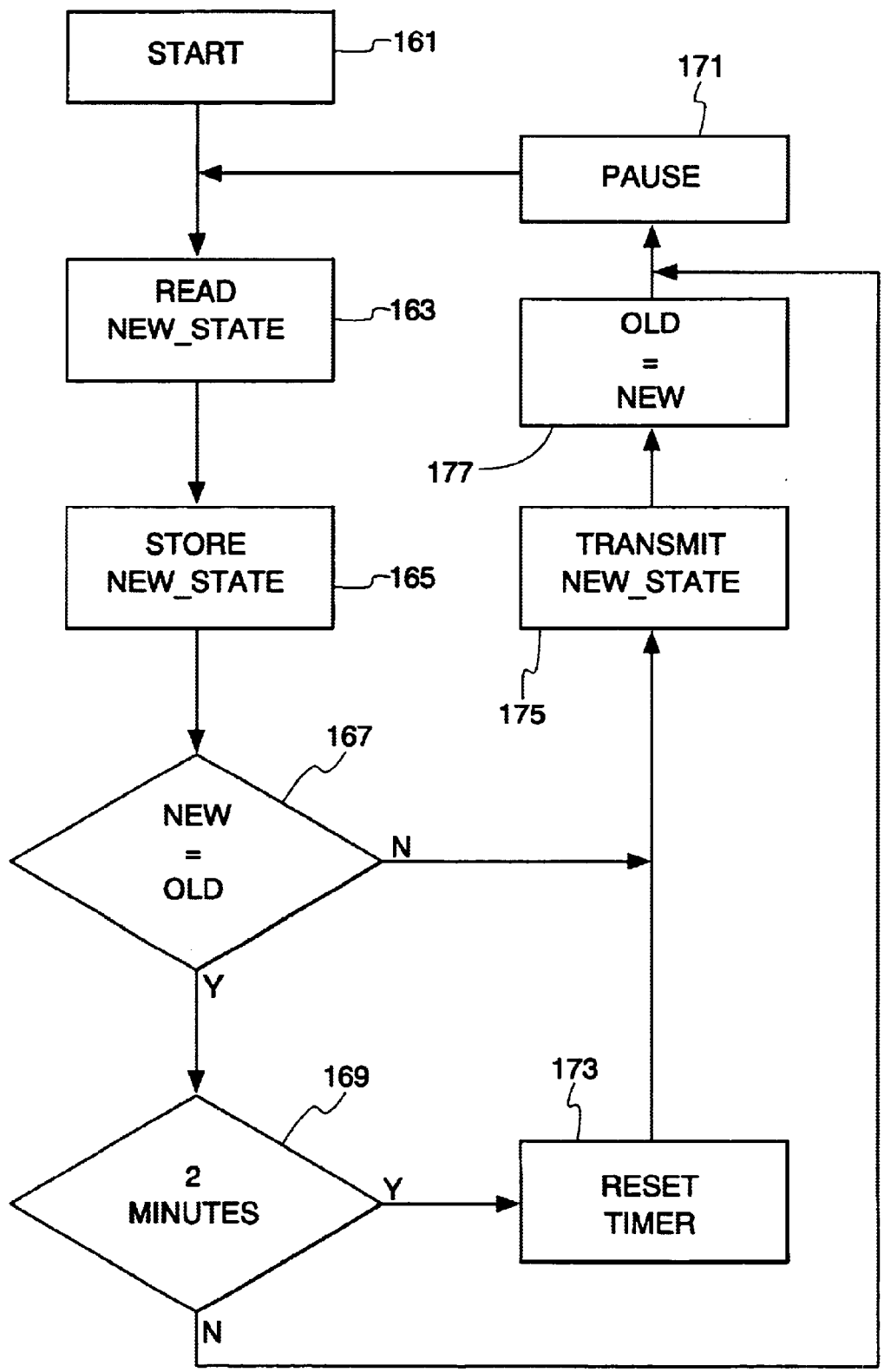
FIG. 6 is a flow diagram of an embodiment of a controller of the animal trap.

FIG. 6 is a flow diagram of the operation of the trap transmitters 133 during normal operation. The flow begins with a start operation 161 which is initiated by the placement of batteries 131 into the trap. Start operations generally comprise those initialization operations normally performed by a processor on power up. After the start is completed, the flow proceeds to a block 163 in which the state of switch 127 is read and assigned to a variable new_state. Flow then proceeds to store the new_state in a block 165 and the new_state is compared with a variable old_state which is stored by controller 129. It should be apparent that an old state represents the state of switch 127 and thus movable trap portion 122 during a last check of trap status.

When new_state equals old_state, no current state change has occurred and flow proceeds to block 169 to determine whether two minutes has expired since the last transmission. When two minutes has not passed, flow proceeds to a pause block 171 which is used to delay the excursions through the program loop represented by FIG. 6. During the pause other processor functions may be performed. After the pause which may only be for 0.5 seconds, for example, flow proceeds back to block 163.

When the decision step 169 determines that 2 minutes has passed since the last transmission, flow proceeds to block 173 where a 2 minute timer is reset and on to block 175 in which the identity code of the device is read from storage 137 and both the identity code and new state are transmitted via transmitter 133 and antenna 135. After such transmission, the variable old_state is set to new_state in block 177 and flow continues to the pause block 171 and back to the program loop discussed above. Similarly, when the performance of decision block 167 determines that new_state and old_state are not equal flow proceeds to the transmit step 175 where the identity code of the trap and the new_state are transmitted as before. From the above it can be seen that the trap continues to test for a state change and for the expiration of two minutes. When either event occurs, the trap code and then present state of the movable portion are rf transmitted and the process continues.

In the display unit, the processor continues to scan for received codes. When a valid code is received, it is successively compared with the codes stored in table 147 to identify which trap sent the code. When the trap is identified, memory 145 table 147 for the just received trap code is updated to represent the new_state of the trap. Processor 143 also performs a continuous loop to read the states of the traps 117–119 from memory 145 and energize the appropriate LED e.g. 113 to visually represent the trap state.

When operating as above described, a baited trap will continue to send a state indication that the trap is ready for use. When an animal takes the bait and springs the trap, the movable portion 122 of the trap moves to catch the animal. The sensor 121 will detect the movement of the movable member and when controller 129 next reads the sensor a signal will be sent to the display unit to reflect the state change. Alternatively, as long as the trap remains unsprung and the movable portion does not move the transmitter 133 will be used every 2 minutes to notify the display unit that the state has not changed.

What is claimed is:

1. An animal trap system comprising:
    a plurality of animal traps, each trap comprising:
        a moving portion having at least two positions;
        a transmitter for periodically rf transmitting a signal including an identity portion identifying the one of the plurality of animal traps comprising the rf transmitter and a position portion identifying the position of the moving portion; and
    a central unit for receiving rf signals from the plurality of animal traps and in response to the transmitted identity portion for identifying the trap comprising the transmitter transmitting each signal and for identifying the position of the moving portion comprised by each animal trap.

2. An animal trap system in accordance with claim 1 wherein each animal trap comprises a switch for generating a trap signal representing the position of the moving portion.

3. An animal trap system in accordance with claim 2, wherein the rf transmitter of each trap responds to the switch to identify the position of the moving portion.

4. An animal trap system in accordance with claim 3 wherein the switch comprises first and second states and the rf transmitter comprises apparatus responsive to a change of state of the switch for transmitting a signal representing the animal trap comprising the switch which changed state and the state into which the moving portion moved.

5. An animal trap system in accordance with claim 1 wherein the central unit comprises apparatus for annunciating the identities of ones of the plurality of animal traps and the position of their respective moving portions.

6. An animal trap system in accordance with claim 5 wherein the apparatus for annunciating comprises a plurality of indicators of animal trap condition each for displaying the position of a movable portion of a respective animal trap.

7. An animal trap system comprising:
- a plurality of animal traps, each trap comprising:
- a moving portion having at least two positions;
- a transmitter responsive to a change in the position of the moving portion for rf transmitting a signal including an identity portion identifying the one of the plurality of animal traps comprising the rf transmitter and a position portion identifying the position of the moving portion; and
- a central unit for receiving rf signals from the plurality of animal traps and for identifying the: trap comprising the transmitter transmitting each signal and for identifying the position of the moving portion comprised by each animal trap.

8. An animal trap system in accordance with claim 7 wherein each animal trap comprises a switch for generating a trap signal representing the position of the moving portion.

9. An animal trap system in accordance with claim 8, wherein the rf transmitter of each trap responds to the switch to identify the position of the moving portion.

10. An animal trap system in accordance with claim 7 wherein the rf transmitter comprises apparatus for periodically transmitting a signal representing the animal trap comprising the transmitting transmitter and the state of the moving portion.

11. An animal trap system in accordance with claim 7 wherein the central unit comprises apparatus for annunciating the identities of ones of the plurality of animal traps and the position of their respective moving portions.

12. An animal trap system in accordance with claim 11 wherein the apparatus for annunciating comprises a plurality of indicators of animal trap condition each for displaying the position of a movable portion of a respective animal trap.

13. An animal trap system in accordance with claim 11 wherein the apparatus for annunciating comprises an automatic e-mail sender.

14. An animal trap system in accordance with claim 13 wherein the apparatus for annunciating comprises an automatic telephone dialer.

* * * * *